March 10, 1964  J. S. REID  3,123,839
WINDSHIELD OPERATING MECHANISM
Filed March 28, 1961  3 Sheets-Sheet 1

INVENTOR
James S. Reid

BY Meyer, Baldwin, Doran & Young
ATTORNEY

March 10, 1964     J. S. REID     3,123,839
WINDSHIELD OPERATING MECHANISM
Filed March 28, 1961     3 Sheets-Sheet 2

INVENTOR
James S. Reid

BY Meyer, Baldwin, Doran & Young
ATTORNEYS

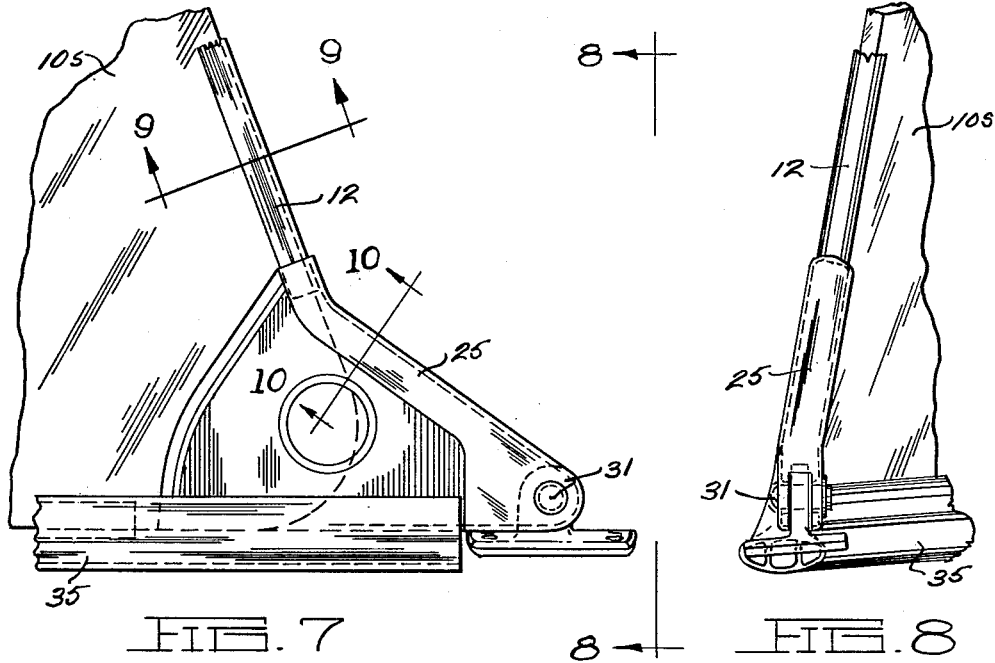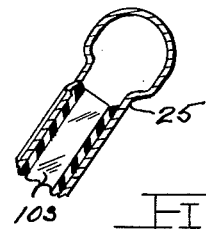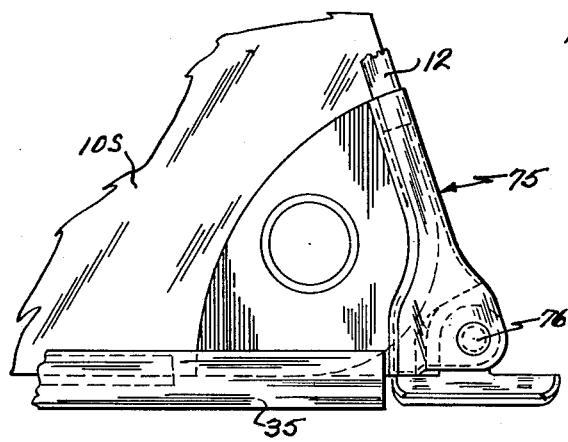
INVENTOR
James S. Reid

United States Patent Office 3,123,839
Patented Mar. 10, 1964

3,123,839
WINDSHIELD OPERATING MECHANISM
James S. Reid, Hudson, Ohio, assignor to The Standard Products Company, Cleveland, Ohio, a corporation of Ohio
Filed Mar. 28, 1961, Ser. No. 98,960
2 Claims. (Cl. 9—1)

This invention relates to new and improved windshield operating mechanism especially designed for use with a vehicle windshield assembly, and has particular utility for use with a marine vehicle windshield that is intended to be adjusted and releasably locked in any predetermined adjusted position within a wide range of adjustment.

A primary object of the present invention is the provision of a new and improved windshield operating mechanism especially designed for use with a windshield of a marine vehicle, and which has particular utility for use with a windshield assembly pivotally mounted on the deck of a marine vehicle, the windshield adjusting mechanism of the present invention being operable so as to locate said windshield in any preselected adjusted position above the aforesaid vehicle deck within a wide range of adjustment.

Another object of the present invention is the provision of a new and improved windshield operating mechanism especially designed for use with a marine vehicle or the like, wherein the windshield assembly is intended to be pivotally mounted to the vehicle deck in a windshielding position, the windshield operating mechanism of the present invention being operable so as to locate said windshield in any preselected adjustable position about its pivotable connection within a wide range of adjustment above the vehicle deck.

Still another object of the present invention is the provision of a new and improved windshield operating mechanism especially designed for use with a windshield assembly pivotally attached to the deck of a marine vehicle or the like, the windshield operating mechanism being operable so as to enable said windshield assembly to be swingable about said pivotal connection and located in a "closed" windshielding position wherein its bottom peripheral edge is in substantial sealing relation with the aforesaid vehicle deck, the operating mechanism including lock means to releasably lock said windshield assembly in said "closed" position.

Additional objects and advantages of the windshield operating mechanism of the present invention will be readily apparent to one skilled in the art to which it pertains, and upon reference to the following disclosure of several preferred embodiments thereof, and which are illustrated in the accompanying drawings wherein:

FIG. 7 is a fragmentary side elevational view showing a preferred bracket assembly for pivotally attaching the windshield to the vehicle deck;

FIG. 8 is a fragmentary elevational view looking approximately in the direction of the arrows 8—8 in FIG. 7;

FIG. 9 is a fragmentary sectional view taken on the plane as is indicated approximately by the line 9—9 in FIG. 7;

FIG. 10 is a fragmentary sectional view taken approximately on the plane as is indicated by the line 10—10 in FIG. 7;

FIG. 11 is a fragmentary side elevational view showing a modified bracket assembly for pivotally mounting the windshield to the vehicle deck;

Figure 1:
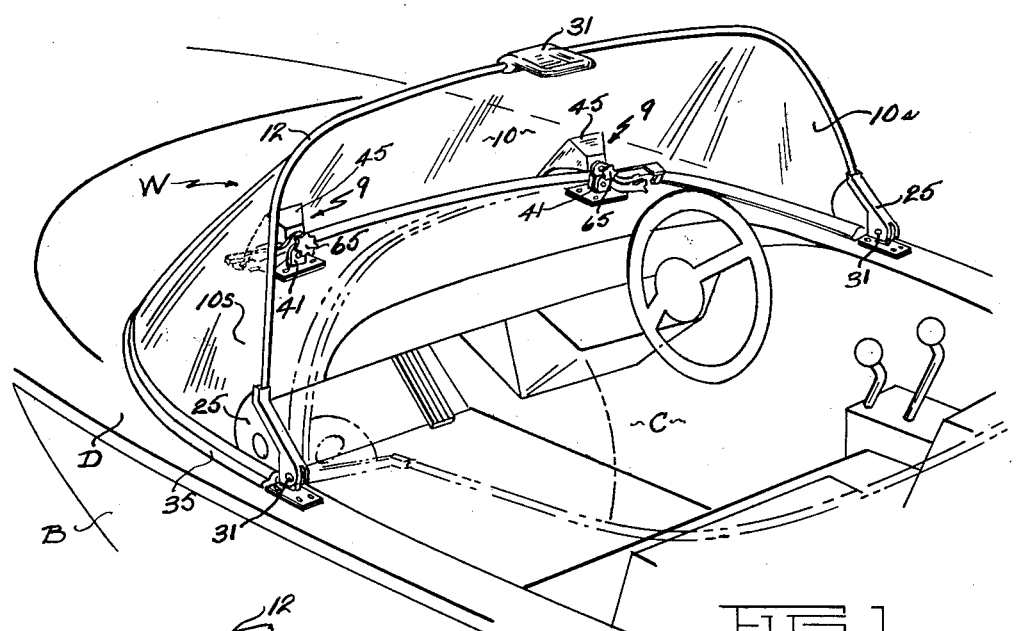
FIG. 1 is a fragmentary perspective view of a marine vehicle having a windshield assembly swingably attached to its deck forwardly of its cockpit, said windshield assembly being adjustable relative to the aforesaid deck by windshield operating mechanism embodying the present invention.

Referring now to the drawings throughout which like elements are designated by the same reference character, the windshield operating mechanism of the present invention, as is herein disclosed in several of its preferred embodiments, is especially designed for use with a windshield assembly W of a boat or like marine vehicle as is seen in FIG. 1, said boat being identified herein in its entirety by the reference character B, and wherein the said windshield assembly is extended across the deck of the boat forwardly of the cockpit C and thereby in a windshielding position and which is pivotally attached at its opposed ends to opposite sides of the vehicle deck.

The instant operating mechanism is intended to enable the windshield assembly W to be swingable about its pivotal connections to a plurality of adjusted positions within a substantially wide range of adjustment, said operating mechanism including means to lock said assembly in any one of said adjusted positions.

With reference now directed particularly to FIG. 1, one embodiment of windshield adjusting mechanism is herein shown, and with the disclosed windshield assembly W pivotally mounted on the boat deck D, it is preferred to use a pair of said adjusting mechanisms, each of which is identified in its entirety by the reference numeral 9, and which mechanisms in addition, are spaced one from the other along the forward bulkhead of the cockpit C. If desired, additional adjusting mechanisms may be utilized with the configuration of windshield assembly W as will be hereinafter apparent. In its present form, the windshield utilized in the instant assembly is commonly referred to in the art as a "wrap around" windshield having a central section 10 which preferably is slightly curved in its longitudinal extension and which in addition, is integrally formed on each of its opposite ends with a side section 10s the latter projecting outwardly and rearwardly therefrom.

As best seen in FIG. 1, the peripheral edge of the windshield preferably mounts a frame 12 comprising a inner seal 13 formed of a suitable pliable material such as soft rubber, one such material being known in the art as nitrile rubber, said seal being disposed within a rigid channel member 21, said channel member preferably extending around the said peripheral windshield edge. In mounting said frame 12, the inner nitrile rubber seal bonds the channel 21 to said windshield edge to thereby provide a substantially unitary windshield assembly W.

The windshield assembly W is intended to be placed in an upright windshielding position forwardly of the cockpit C so as to extend laterally across the deck D, the opposed ends of said windshield assembly mounting brackets identified at 25, said brackets in turn, being pivotally mounted at 31 to the boat deck D.

Figure 1A:
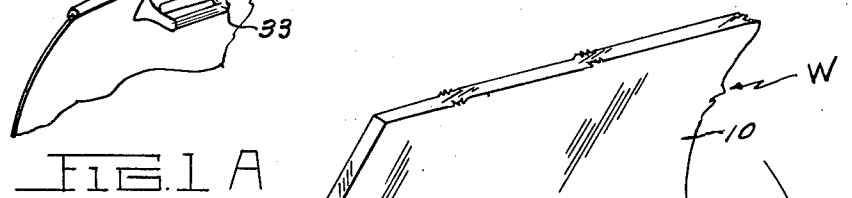
FIG. 1A is a fragmentary perspective view showing a modified form of hand adjusting means for use with the operating mechanism and which is preferably attached directly to the windshield for adjusting the same.
Figure 2:
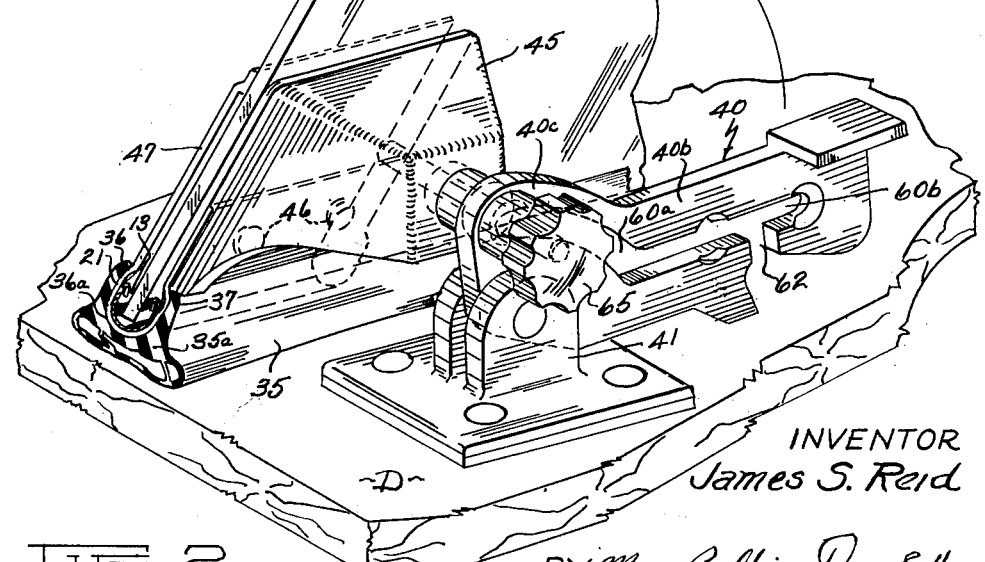
FIG. 2 is a fragmentary perspective view showing one of the windshield operating mechanisms embodying the present invention.
Figure 3:
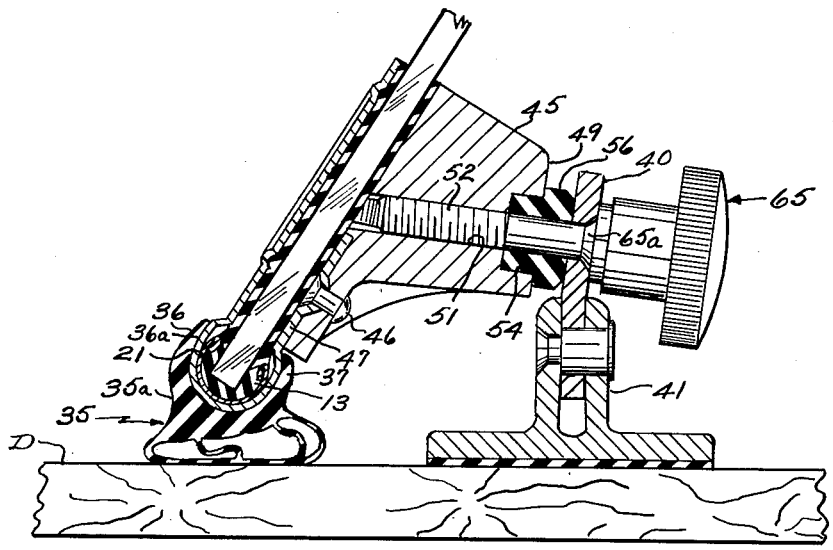
FIG. 3 is a vertical sectional view of the windshield operating mechanism shown in FIG. 2.

A handle member 33, as seen in FIG. 1, is mounted on the upper peripheral edge of the windshield assembly W, preferably at the center thereof so as to be readily accessible to the operator to thereby enable the said windshield to be easily swung about the aforementioned pivotal connections 31. The handle member 33 may also be suitably bonded directly to the windshield as is seen in FIG. 1A so as to be below the upper peripheral edge of the latter if it is desired to attach a cover or other closure to the same.

The windshield assembly W as seen in FIG. 1 is in its "closed" position wherein its bottom peripheral edge portion which, in its longitudinal extension closely conforms to the lateral contour of the deck D is intended to be in substantial sealing relation with said deck.

For this purpose, a seal strip as is identified in its entirety by the reference numeral 35, is seen to have a central body portion 35a integrally formed with a pair of spaced curved lips 36 and 37 respectively, extending upwardly therefrom so as to define a groove 36a having a configuration suitable to accommodate the aforesaid channel 21 of the windshield frame overlying the bottom peripheral edge portion of the windshield, said seal snapping over said frame and thus firmly secured to said peripheral edge portion and thereby movable with the same. The seal strip 35 is likewise seen to be integrally formed with an enlarged bottom portion preferably bulbous in exterior configuration and of cellular internal construction.

As is aforementioned, the seal strip 35 is securely attached to the bottom peripheral edge of the windshield assembly W being thereby movable with the same so that in the "closed" position for said assembly it is in sealing relation with the boat deck D. In this position the cellular portion of the seal strip is intended to be partially collapsed under the influence of the gravitational force of the windshield assembly so as to closely conform to the variations in the contour of said deck and to thereby provide an efficient seal between the latter and said bottom peripheral edge of the windshield assembly W.

As is aforementioned, the windshield adjusting mechanism of the present invention is adapted to releasably lock the windshield assembly in its "closed" position and/ or to permit the said assembly to be pivotally adjusted about the pivotal connections therefore to one of a plurality of adjusted positions and to also enable said assembly to be locked in said preselected adjusted position.

To accomplish this, the instant embodiment of windshield adjusting mechanism 9 includes a lever 40 having a base part 40a formed on its one end with an elongated arm 40b, said base part 40a being swingably attached to a bracket 41 mounted on the boat deck D so as to be spaced rearwardly of the bottom peripheral edge of the windshield assembly when the latter is in its "closed" position. The lever 40 is preferably swingable about an axis substantially perpendicular to the plane of the windshield portion directly forwardly therefrom.

A block member 45 is seen to be securely fastened by means of rivets 46 to a clip member 47, the latter being somewhat U-shaped in vertical section and extending around and embracing the bottom peripheral edge portion of the windshield assembly directly forwardly of its associated lever 40.

The block member 45 is somewhat pyramidal in configuration and mounted on the aforesaid clip member 47 so as to extend rearwardly from the windshield assembly, said block member, in addition having a substantially flat end wall 49 spaced forwardly of the lever 40.

An internally threaded aperture, as indicated at 51, is formed in the block member, being located therein so as to be directly above the pivotal connection for its associated lever 40. Said aperture is likewise seen to be countersunk at 54 to thereby receive the neck portion of a bushing member 56 formed of a suitable displaceable material such as rubber, the body of the bushing preferably overlying the end wall 49 of said block member and extending across the space between the latter and said lever 40.

Figures 4, 5, 6:
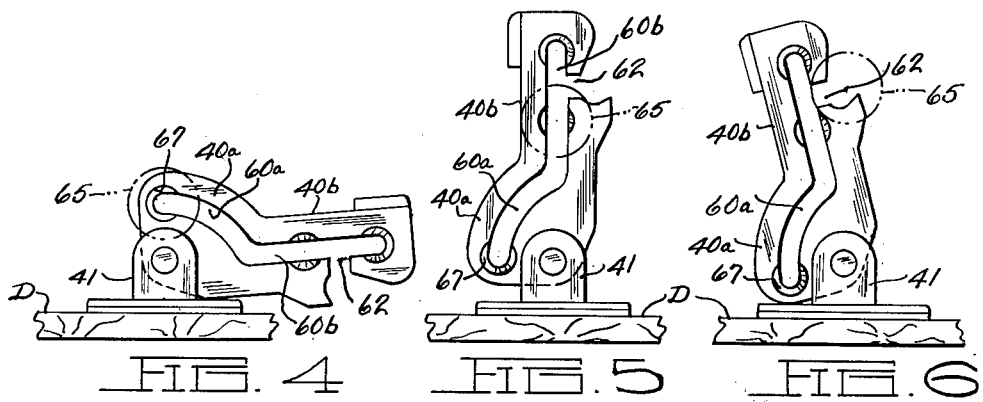
FIG. 4 is a front view of the latching lever incorporated in the windshield operating mechanism of the present invention and which is shown herein in its "locking" position.
FIG. 5 is a view similar to that of FIG. 4 but showing the latching lever in an upright "adjusting" or "opening" position.
FIG. 6 is also a front view of the latching lever as it is shown in its "unlatching" position.

As seen in FIG. 4, the lever 40 is formed with a longitudinal slot having an arcuate portion 60a of constant radius about the pivotal connection for said lever, and a linear part 60b communicating at its one end with said arcuate portion and which extends longitudinally through the arm 40b of said lever. An opening 62 is likewise provided in said lever arm 40b connecting with the aforesaid liner slot part 60b, preferably spaced from its opposite end, the purpose for which will be presently explained.

The instant operating mechanism also includes a lock bolt 65 which is seen to have its shank extending through the lever slot and bushing member 56 and threadably disposed in the block member aperture 51 to thereby connect said block member and hence the windshield assembly W directly to the boat deck D.

As seen in FIG. 4, the lever 40 is fully clockwise to one side of its mounting bracket 41 so as to extend substantially laterally across the boat deck D, this position being hereinafter referred to as the "locking" position for said lever.

In this position, the windshield assembly W is swung about its pivotal deck connections so as to bring the seal strip 35 carried on its bottom peripheral edge into sealing relation with the boat deck D.

Likewise, in this "locking" position the lever 40 is intended to project laterally of its pivotal connection so as to locate the lock bolt 65 at the closed end of the arcuate portion 60a of the aforementioned lever slot, at which position said lever is provided with a recess 67 surrounding said closed slot end and which is intended to accommodate a radial flange 65a formed on said lock bolt being thus effective to retain the same and the windshield assembly W in its "sealing" relation with the boat deck D.

In FIG. 5, the lever 40 is shown in substantially a vertical upright position, hereinafter referred to as its "open" position whereby the lock bolt 65 is disposed at the opposite end of the arcuate slot portion and at the communicating end of the linear part 60b of said slot. In this position, the windshield assembly W may be selectively swung upwardly about its pivotal deck connections to carry the lock bolt within the confines of said linear slot part and to thereby selectively position the said windshield assembly in a plurality of adjusted or raised positions above said deck.

The lever arm 40b is also preferably provided with suitable recesses at predetermined spaced intervals along the linear slot part 60b, the instant lever embodiment, for example, showing recesses at the mid point and opposite end of said slot part and which are intended to operatively cooperate with the aforementioned radial flange 65a of the lock bolt 65 to thus retain the same and the windshield assembly W in either a half open and/or a fully open position, respectively.

As seen in FIG. 6, with the windshield assembly W in an adjusted raised position effective to locate the lock bolt 65 opposite the opening 62 in the lever arm 40b, said lever may then be swung counterclockwise so as to cause said bolt to be passed through said opening and outwardly of said slot. In this manner, the lever 40 is disengaged from said lock bolt and thereafter the windshield assembly may be swung upwardly to any selected position about its pivotal deck connections, for example, to the position as is shown in dotted lines in FIG. 1, whereby if desired, repair, maintenance and the like may be readily performed thereon.

With this construction, it will now be realized that the windshield operating mechanism of the present invention is operable to enable the windshield assembly W to be swung about its pivotal deck connections so as to locate the same in a "closed" position wherein its bottom peripheral edge is in sealing relation with the boat deck and/or in any one of a plurality of preselected adjusted positions above the aforesaid deck within a substantially wide range of adjustment; said operating mechanism likewise being operable to lock said assembly in any of the said positions.

In FIG. 11 I have herein disclosed a modified form of end bracket 75 for pivotally mounting the opposed ends of the windshield assembly W to the boat deck D.

As herein shown, mounting bracket 75 is more compact in its construction, in that the pivotal deck connection therefore as indicated at 76 is spaced in close juxtaposition to the end of the windshield assembly attached thereto, whereas in the previous embodiment said pivotal deck connection, as is noted, is spaced in a more remote location relative to said attached windshield end portion.

Figures 12, 13:
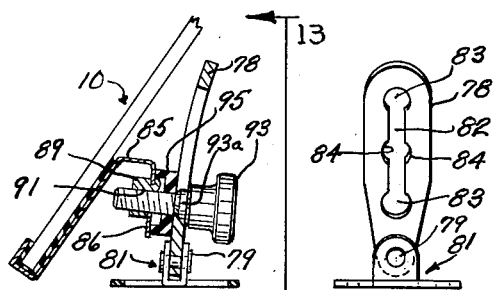
FIG. 12 is a vertical elevational view shown partially in section of a second embodiment of windshield adjusting mechanism embodying the present invention; and, FIG. 13 is a front view looking in the direction of the arrows 13—13 in FIG. 12 and showing the latching member for use with the instant windshield adjusting mechanism.

Said modified bracket mounting may be preferred over the aforesaid previous embodiment where, for example, it is required to have the windshield pivotal connections in a forwardmost position on the boat deck D. In FIGS. 12 and 13, I have herein shown another embodiment of windshield adjusting mechanism and which is operable with the windshield assembly W to permit its adjustment in a manner similar to that previously described, and to retain said windshield in its preselected adjusted position.

With particular attention directed specifically to FIG. 12, the instant form of windshield adjusting mechanism is seen to include an elongated latch member 78 disposed preferably in a vertical plane and having its bottom end rigidly fastened to an upstanding plate 79 of a bracket 81.

Said latch member is seen to be formed with a closed slot 82 extending longitudinally centrally therethrough, said slot having an arcuate opening 83 communicating therewith at each of its ends, and arcuate grooves 84 disposed at predetermined intervals along each side of said slot in spaced pairs, the instant embodiment of latch member showing merely one pair of said grooves located at substantially the midpoint of said slot. In place of the block member 45 in the previous embodiment of operating mechanism, the instant assembly prefers to use a bracket member 85 which is anchored to the bottom peripheral edge of the windshield and which, in addition, is provided with a depending wall 86 spaced rearwardly of said windshield and located preferably directly opposite the aforesaid latch member 78.

Said depending wall 86 mounts an anchor member 89, which in turn, has an internally threaded aperture formed centrally therein as is indicated at 91. A lock bolt 93 is seen to be disposed within the aforementioned slot 82 and to have its shank threadably disposed within the aperture 91 to thereby interconnect the said members together.

As best seen in FIG. 12, a spacer element 95, preferably formed of a suitable pliable material such as rubber, is interposed between the latch member 78 and depending leg of the bracket 85, said spacer being operable in response to threading the aforesaid lock bolt 93 within said aperture 91 to resiliently bind the latch member and said bracket together.

With this assembly, the windshield assembly W may be swung about its aforementioned pivotal deck connections to bring the peripheral seal strip 35 into sealing relation with said deck at which position the lock bolt 93 is intended to be located at the lowermost end of the slot 82 as is defined by the aforementioned opening 83 formed thereat, at which position the lock bolt 93 may be threaded into the anchor member 89 sufficiently to locate the radial flange 93a of said bolt within said opening whereby the windshield assembly W is locked in said position.

In like manner, by loosening the lock bolt 93 to thereby remove its radial flange 93a from within the lowermost slot opening 83 the windshield assembly W may thereafter be swung upwardly from this "sealing" position to carry the lock bolt upwardly through the slot 82, to locate said bolt at still another preselected one of its adjusted positions therein, such as for example at the medial position therealong as is defined by the opposed pair of grooves 84, at which position said lock bolt may again be threaded into the anchor member 89 sufficiently to locate its radial flange 93a within the opposed grooves effectively to lock the windshield assembly W in said adjusted position above the boat deck D.

Having thus described several preferred embodiments of windshield adjusting mechanism of the present invention, it will now be realized that the same is susceptible to various modifications, combinations and arrangements of its component parts without departing from the inventive concepts of the said mechanism as are defined in the appended claims.

What is claimed is:

1. In combination, a windshield and means pivotally mounting said windshield on a boat deck, operating mechanism for swingably adjusting said windshield about said pivotal means, comprising a lever attached to said deck about an axis generally perpendicular to said windshield and swingably movable laterally of said windshield between latching and unlatching positions, means defining an open ended slot in said lever, said slot having an arcuate portion of constant radius about said axis and a communicating linear portion, lock means extendable into said slot and interconnecting said lever and said windshield, said lock means being movable with said windshield to one of a plurality of adjusted positions about said pivotal means, said lock means moving along said lever and through said linear slot portion, and means on said lever adjacent said slot and cooperating with said lock means for releasably locking said windshield to said lever in said adjusted position.

2. In combination, a windshield and means pivotally mounting said windshield on a boat deck, seal means carried on the bottom longitudinal edge of said windshield, operating mechanism for swingably adjusting said windshield about said pivotal means, comprising a lever swingably attached to said deck about an axis generally perpendicular to said windshield and swingably movable laterally of said windshield between latching and unlatching positions, means defining an open ended slot in said lever, said slot having an arcuate portion of constant radius about said axis, lock means extendable into said slot and interconnecting said lever and said windshield, said windshield being swingable about said pivotal means to bring said seal means into sealing relation with said deck, said lock means moving through and to one end of said arcuate slot portion, said lever being thereafter movable to its latching position, and said lock means being operable to releasably lock said windshield to said lever.

References Cited in the file of this patent
UNITED STATES PATENTS

| | | |
|---|---|---|
| 1,109,769 | Lawrence | Sept. 8, 1914 |
| 1,597,943 | Wilhelm | Aug. 31, 1926 |
| 2,001,602 | Dietz | May 14, 1935 |
| 2,968,845 | Dickinson | Jan. 24, 1961 |
| 3,021,535 | Dorst | Feb. 20, 1962 |

FOREIGN PATENTS

| | | |
|---|---|---|
| 23,265 | Great Britain | 1897 |